(12) United States Patent
Morin et al.

(10) Patent No.: US 11,279,650 B2
(45) Date of Patent: Mar. 22, 2022

(54) HEATING DEVICE EQUIPPED WITH A DOOR COMPRISING A TRIPLE GLAZING

(71) Applicant: SAINT-GOBAIN GLASS FRANCE, Courbevoie (FR)

(72) Inventors: Camille Morin, Paris (FR); Arnaud Huignard, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 13 days.

(21) Appl. No.: 16/971,202

(22) PCT Filed: Feb. 26, 2019

(86) PCT No.: PCT/FR2019/050441
§ 371 (c)(1),
(2) Date: Aug. 19, 2020

(87) PCT Pub. No.: WO2019/166736
PCT Pub. Date: Sep. 6, 2019

(65) Prior Publication Data
US 2021/0094870 A1    Apr. 1, 2021

(30) Foreign Application Priority Data
Feb. 28, 2018   (FR) ........................................ 1851773

(51) Int. Cl.
*B32B 15/04*      (2006.01)
*C03C 17/36*     (2006.01)
*F24C 15/04*     (2006.01)

(52) U.S. Cl.
CPC ........ *C03C 17/366* (2013.01); *C03C 17/3644* (2013.01); *C03C 17/3686* (2013.01);
(Continued)

(58) Field of Classification Search
CPC ...................... C03C 2217/948; C03C 17/3644
(Continued)

(56) References Cited

U.S. PATENT DOCUMENTS 5,337,727 A *   8/1994  Borens ..................... F24C 15/04
                                                                126/198
9,074,777 B2 *  7/2015  Catalogne ............. F24C 15/006
(Continued)

FOREIGN PATENT DOCUMENTS

EP          1 293 726 A2    3/2003
WO     WO 2011/104034 A1    9/2011
(Continued)

OTHER PUBLICATIONS

International Search Report as issued in International Patent Application No. PCT/FR2019/050441, dated Jul. 1, 2019.

*Primary Examiner* — Lauren R Colgan
(74) *Attorney, Agent, or Firm* — Pillsbury Winthrop Shaw Pittman LLP

(57) ABSTRACT

A heating device equipped with a chamber defining a cavity, includes a door or wall incorporating a triple glazing including three transparent substrates defining, from the interior to the exterior of the cavity, faces numbered 1 to 6 respectively, at least the faces 1 and 2 of the first substrate and 3 and/or 4 of the second substrate being covered with heat-reflecting coatings, wherein the mean spacing e1 between the first substrate and the second substrate and the mean spacing e2 between the second substrate and the third substrate is different, the ratio between the largest spacing and the smallest spacing being greater than 1.1, and e1 and e2 being between 2 and 20 mm.

17 Claims, 1 Drawing Sheet

(52) U.S. Cl.
CPC .. *C03C 2217/944* (2013.01); *C03C 2217/948* (2013.01); *C03C 2218/156* (2013.01); *C03C 2218/365* (2013.01); *F24C 15/04* (2013.01)

(58) Field of Classification Search
USPC .................................. 428/428, 432; 126/200
See application file for complete search history.

(56) References Cited

U.S. PATENT DOCUMENTS

| | | | |
|---|---|---|---|
| 10,274,203 B2* | 4/2019 | Luckhardt | ............... F24C 15/04 |
| 2003/0113550 A1 | 6/2003 | Millett et al. | |
| 2012/0084963 A1 | 4/2012 | Thomsen et al. | |
| 2015/0068510 A1* | 3/2015 | Lee | ....................... F24C 15/006 |
| | | | 126/198 |

FOREIGN PATENT DOCUMENTS

| WO | WO 2015/033067 A1 | 3/2015 |
|---|---|---|
| WO | WO 2016/097560 A1 | 6/2016 |

\* cited by examiner

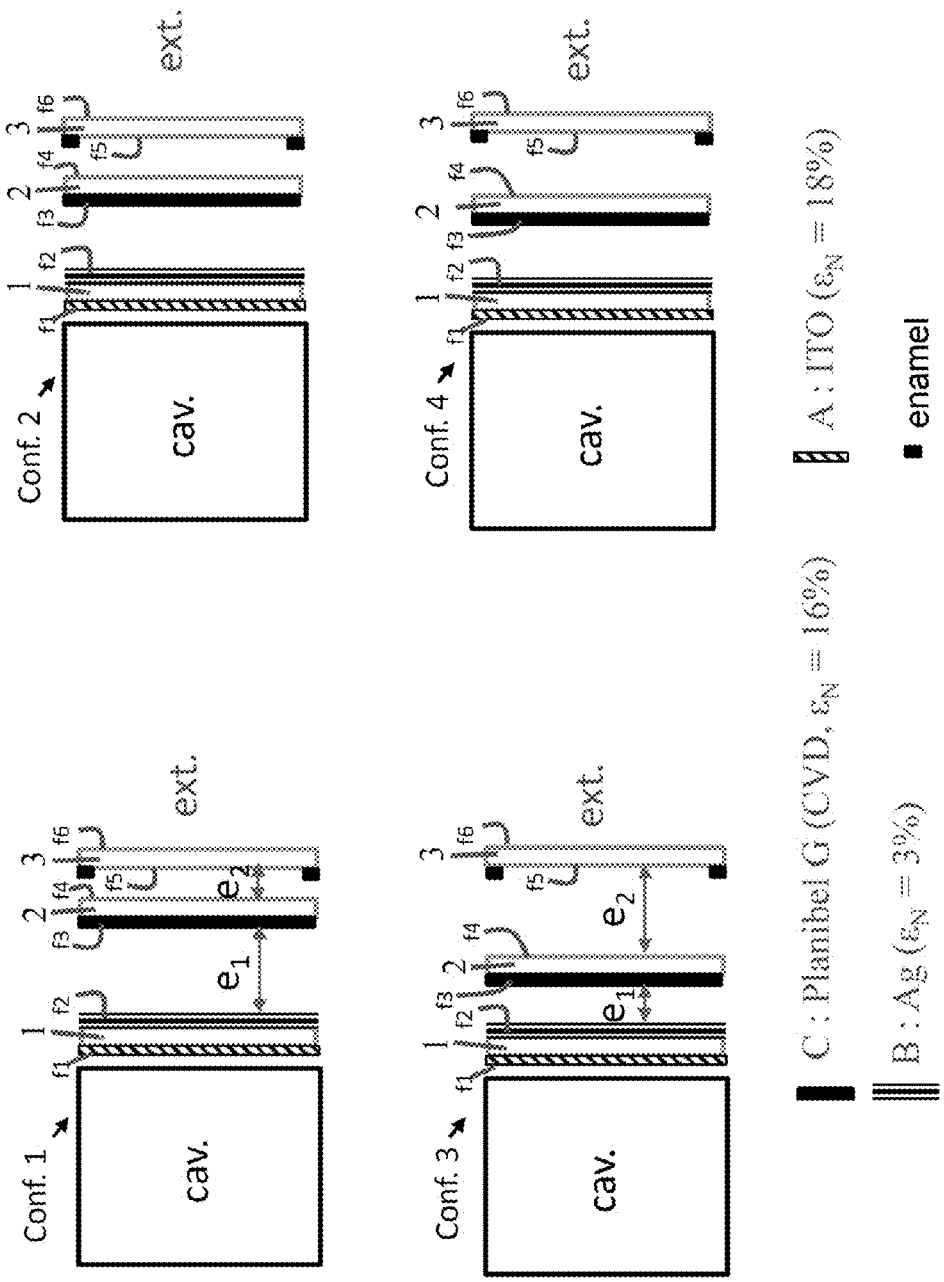

HEATING DEVICE EQUIPPED WITH A DOOR COMPRISING A TRIPLE GLAZING

CROSS-REFERENCE TO RELATED APPLICATIONS

This application is the U.S. National Stage of PCT/FR2019/050441, filed Feb. 26, 2019, which in turn claims priority to French patent application number 1851773 filed Feb. 28, 2018. The content of these applications are incorporated herein by reference in their entireties.

The invention relates to a heating device equipped with a chamber defining a cavity, said cavity being closed by a door incorporating a glazing confining the heat in the cavity of the device. The invention also relates to such a door and to its use as constituent element of such a device.

A heating device according to the invention comprises a chamber defined by one or more walls including a glazed door. Heating means allow the cavity in the interior of the chamber to be heated to a high temperature. The heating devices may in particular be chosen from ovens, fireplaces, furnaces, etc.

The glazings used as constituent elements of a door or possibly of a wall of a heating device are in general multiple glazings, i.e. glazings comprising a plurality of glass substrates, and in particular quadruple glazings. Multiple glazing units contribute to keeping heat in the interior of the heating device while keeping the exterior surface of the glazing cold to the touch, in order to protect users from burns.

Such a multiple glazing comprises at least two substrates held a distance apart so as to define a space. The faces of the glazing are by convention denoted, starting from the interior of the heating device, by numbering the faces of the substrates from the interior to the exterior of the heating device.

The glazings used as constituent elements of a heating device may comprise substrates coated with functional coatings that reflect thermal radiation, in particular infrared (IR) radiation. These coatings allow the amount of energy transmitted to the exterior of the heating device to be decreased by reflecting the heat toward the interior of the chamber. Use of these coatings contributes to reducing the power consumption of the heating device and heating of the external wall of the glazing forming the door of said oven.

For example, patent application EP1293726 A2 describes a glass barrier comprising, on a first surface, a heat-reflecting coating deposited by pyrolysis, and on a second surface, a heat-reflecting coating deposited by a physical vapor deposition (PVD) process.

Coatings comprising functional metal layers based on silver (or silver layers) are known to be the most effective way of decreasing the emissivity of glazings while preserving the optical and esthetic qualities of the wall or door, and in particular the good vision through the latter. These coatings also ensure a higher level of user protection, a lower power consumption and greater user comfort.

However, the thermal resistance of coatings comprising these silver-based functional metal layers is often insufficient. The low thermal and chemical resistance of these coatings may result, in the long term, in the appearance of defects such as spots of corrosion, scratches, dewetting of the silver, or even complete or partial delamination of the stack.

This effect is accentuated when such glazings incorporating thin silver layers are used in heating devices, for example as oven doors, and are subjected to long and repeated high-temperature heat-treatment cycles in a humid environment, such as pyrolysis treatments. These heat-treatment cycles in a humid environment then accelerate the degradation of the silver layers, in particular via dewetting or corrosion of the silver.

Furthermore, any defect or scratch, whether it be due to corrosion or to mechanical stresses, is liable to degrade not only the optical and energy performance of the coated substrate but also its esthetics.

Patent application US 2012/0084963 however discloses a multiple glazing used as a constituent element of an oven door comprising a transparent substrate coated with a stack of thin layers comprising at least one silver-based functional metal layer and a zirconium-oxide-based protective top layer. The zirconium-oxide-based layers protect the stack during a high-temperature heat treatment. However, substrates coated with such protective layers are subject to corrosion in hot humid environments.

Patent application WO 2016/097560 describes a glazing comprising a transparent substrate coated with a stack of thin layers comprising at least one silver-based functional metal layer, characterized in that the stack comprises a protective top layer based on titanium zirconium oxide.

Patent application US 2003/0113550 describes a multiple glazing that may be used as an oven door and that comprises a succession of glass substrates, heat-reflecting stacks being positioned on various faces of these glass substrates.

Although the stacks described in the aforementioned publications in principle allow the required criteria of mechanical strength and chemical resistance to be met at the usual operating temperature of the oven, oven door configurations in which the performance in terms of thermal insulation is optimal and that are easy to manufacture, preferably at lower cost, are currently still being researched.

An architecture is in particular sought that would make it possible not only to guarantee a cold exterior face of the wall on the exterior side, i.e. guaranteeing user safety with respect to possible burns, but also to effectively confine heat in the chamber or cavity of the device. Furthermore, it is desired for the device to be as energy-efficient as possible, and in particular for the cooling of the wall thereof to require little or no additional action, such as for example a flow of cooling air through the various constituent substrates of said wall.

The aim of the present invention is to provide a heating device, and a door or a wall equipping such a device, allowing the aforementioned problems to be effectively solved.

The term heat is understood to mean all or some of the radiation emitted by the resistors of the oven, in particular infrared radiation between 2 micrometers and 10 micrometers.

More specifically, the present invention relates to a heating device equipped with a chamber defining a cavity, said device comprising a door or a wall incorporating a triple glazing comprising three transparent substrates defining, from the interior to the exterior of the cavity, faces numbered 1 to 6 respectively, at least the faces 1 and 2 of the first substrate and 3 or 4 of the second substrate being covered with heat-reflecting coatings, characterized in that the mean spacing $e_1$ between the first substrate and the second substrate and the mean spacing $e_2$ between the second substrate and the third substrate is different, the ratio between the largest spacing and the smallest spacing being greater than 1.1, preferably greater than 1.5 and very preferably greater than 2, or even greater than 2.5.

A triple glazing is understood to mean an assembly of three successive glass sheets, but not connected together by spaces, in particular hermetically, as is the case in a triple glazing typically used in the field of building glazing.

The glass substrates according to present invention are intended for the manufacture of a heating device such as an oven. Their surface area is therefore typically less than 0.5 m².

Other preferred embodiment and/or implementation details of the present invention are given below, which may of course be combined together if need be:
faces 1 and 2 of the first substrate and 3 of the second substrate are covered with heat-reflecting coatings, faces 4 to 6 preferably being free of such coatings;
$e_1 > e_2$;
$e_2 > e_1$;
$e_1$ and $e_2$ are between 2 and 20 mm, preferably between 4 and 15 mm;
the ratio between the largest spacing and the smallest spacing is less than 5, preferably less than 4 and very preferably less than 3.5, or even less than 3.0;
the intermediate spacings between the substrates are filled with air in contact with the outside atmosphere (and therefore with air at standard pressure);
the substrates are parallel to one another;
the triple glazing comprises:
 a) for the first substrate in contact with the cavity:
  on a first face 1, turned toward the interior of and in direct contact with said cavity, a first stack that reflects heat essentially by means of one or more functional layers based on a transparent conductive oxide, preferably chosen from mixed indium tin oxides or fluorine- or Sb-doped tin oxides,
  on the other face 2, turned toward the exterior of said cavity, a second stack that reflects heat essentially by means of one or more functional layers based on a metal chosen from gold or silver, preferably silver,
 b) for the second substrate:
  on the face 3 turned toward the interior of said cavity, a third stack that reflects heat essentially by means of one or more functional layers based on a transparent conductive oxide, preferably chosen from mixed indium tin oxides or fluorine- or Sb-doped tin oxides,
  the face 4 of the second substrate preferably being free of a heat-reflecting coating,
the faces 5 and 6 of the third substrate being free of a heat-reflecting coating;
the triple glazing comprises:
 a) for the first substrate in contact with the cavity:
  on a first face 1, turned toward the interior of and in direct contact with said cavity, a first stack that reflects heat essentially by means of one or more functional layers based on a transparent conductive oxide, preferably chosen from mixed indium tin oxides or fluorine- or Sb-doped tin oxides,
  on the other face 2, turned toward the exterior of said cavity, a second stack that reflects heat essentially by means of one or more functional layers based on a metal chosen from gold or silver, preferably silver,
 b) for the second substrate:
  on the face 3 turned toward the interior of said cavity, a third stack that reflects heat essentially by means of one or more functional layers based on a metal chosen from gold or silver, preferably silver,
  the face 4 of the second substrate preferably being free of a heat-reflecting coating,
the faces 5 and 6 of the third substrate being free of a heat-reflecting coating;
the first coating (or first stack) on face 1 comprises, as functional layer, an indium tin oxide, the atomic percentage of Sn of which in the oxide is advantageously within a range extending from 5% to 70% and in particular from 10% to 60%;
the first coating (or first stack) on face 1 comprises, as functional layer, an indium tin oxide preferably comprising a proportion by weight of around 85% to 95% of indium oxide and around 15% to 5% of tin oxide;
the first coating (or first stack) on face 1 comprises, in succession, starting from the substrate:
 at least one underlayer of a dielectric compound in particular chosen from silicon nitride, silicon oxide or zinc tin oxide,
 an ITO functional layer, and
 at least one overlayer of a dielectric compound in particular chosen from silicon nitride, silicon oxide, or zinc tin oxide;
the first coating (or first stack) on face 1 comprises, in succession, starting from the substrate:
 at least one underlayer of a dielectric compound in particular chosen from silicon nitride, silicon oxide or zinc tin oxide,
 a first ITO functional layer,
 an intermediate layer of a dielectric compound, in particular chosen from silicon oxide, silicon nitride or zinc tin oxide,
 a second ITO functional layer; and
 at least one overlayer of a dielectric compound in particular chosen from silicon nitride, silicon oxide, or zinc tin oxide;
the second coating (or second stack) on face 2 comprises at least one silver-based functional metal layer and at least two dielectric assemblies, each dielectric assembly comprising at least one dielectric layer, so that each silver-based layer is positioned between two dielectric layers;
the third coating (or third stack) on face 3 or face 4 of the second substrate comprises at least one silver-based functional metal layer and preferably at least two dielectric assemblies, each dielectric assembly comprising at least one dielectric layer, so that each silver-based layer is positioned between two dielectric layers;
at least the coated substrate of the stack is curved and/or tempered and preferably wherein all the substrates of the glazing are tempered.

The invention also relates to a door or wall for a heating device comprising a triple glazing, the three transparent substrates of which define, from the interior to the exterior of the cavity of said device, faces numbered 1 to 6 respectively, at least the faces 1 and 2 of the first substrate and 3 of the second substrate being covered with heat-reflecting coatings, characterized in that the mean spacing $e_1$ between the first substrate and the second substrate and the mean spacing $e_2$ between the second substrate and the third substrate is different, the ratio between the largest spacing and the smallest spacing being greater than 1.1, preferably greater than 1.5 and very preferably greater than 2, or even greater than 2.5.

According to particular and preferred modes of a door according to the invention:
the faces 1 and 2 of the first substrate and 3 of the second substrate are covered with heat-reflecting coatings, the faces 4 to 6 preferably being free of such coatings;

$e_1 > e_2$;
$e_2 > e_1$;
said triple glazing comprises:
- a) for the first substrate in contact with the cavity:
  - on a first face 1, turned toward the interior of and in direct contact with said cavity, a first stack that reflects heat essentially by means of one or more functional layers based on a transparent conductive oxide, preferably chosen from mixed indium tin oxides or fluorine- or Sb-doped tin oxides,
  - on the other face 2, turned toward the exterior of said cavity, a second stack that reflects heat essentially by means of one or more functional layers based on a metal chosen from gold or silver, preferably silver,
- b) for the second substrate:
  - on the face 3 turned toward the interior of said cavity, a third stack that reflects heat essentially by means of one or more functional layers based on a transparent conductive oxide, preferably chosen from mixed indium tin oxides or fluorine- or Sb-doped tin oxides;

said triple glazing comprises:
- a) for the first substrate in contact with the cavity:
  - on a first face 1, turned toward the interior of and in direct contact with said cavity, a first stack that reflects heat essentially by means of one or more functional layers based on a transparent conductive oxide, preferably chosen from mixed indium tin oxides or fluorine- or Sb-doped tin oxides,
  - on the other face 2, turned toward the exterior of said cavity, a second stack that reflects heat essentially by means of one or more functional layers based on a metal chosen from gold or silver, preferably silver,
- b) for the second substrate:
  - on the face 3 turned toward the interior of said cavity, a third stack that reflects heat essentially by means of one or more silver-based functional layers.

The invention also relates to a use of a triple glazing as described above as a constituent element of the wall or of a door of a heating device equipped with a chamber and/or a cavity such as an oven.

Of course, all the features described above in relation to the heating device also pertain to said wall or door, although they are not repeated here for the sake of conciseness.

The transparent substrates used according to the invention are preferably made of a rigid mineral material, preferably glass, in particular soda-lime-silica, borosilicate or aluminosilicate glass. They may also be made of glass-ceramic. According to one advantageous embodiment, the substrates are borosilicate glasses, which withstand very high temperatures well.

The thickness of the substrate(s) generally varies between 0.5 mm and 19 mm. The thickness of the substrate(s) is preferably less than or equal to 6 mm, or less than or equal to 4 mm.

The transparent substrates coated with the stacks may have undergone a high-temperature heat treatment chosen from annealing, for example flash annealing such as laser or flame annealing, tempering and/or bending. The temperature of the heat treatment is above 400° C., preferably above 450° C. or even above 500° C. The substrate coated with the stack may therefore be curved and/or tempered. The first substrate coated with stacks on each face is preferably a tempered glass, in particular when it forms part of a glazing used as a constituent element of a heating device or of a fire-resistant door.

According to the invention the glazing is triple glazing and therefore comprises only three substrates, more preferably glass substrates, i.e. an interior substrate (first substrate), a central or intermediate substrate (second substrate) and an exterior substrate (third substrate), the three substrates thus defining 6 faces. Face 1 faces the interior of the heating device and therefore forms the interior wall of the glazing. Faces 2 to 5 are in the interior of the triple glazing. Face 6 is on the exterior of the heating device and therefore forms the exterior wall of the glazing.

As regards the first stack, this preferably comprises one or more functional layers made of transparent conductive oxide as heat-reflecting functional layer (and therefore no other conductive layers in particular made of a metal such as silver). Use is made, according to the invention, of any coating comprising a functional layer based on and preferably made of transparent conductive oxide of ITO type, i.e. based on a mixed indium tin oxide. The expression "based on" is in particular understood, within the context of the present invention, to mean that the layer in question comprises at least 80%, or 90% and even 95% by weight of the compound in question. The layer may even advantageously consist or essentially consist of such a compound. Preferably, the stack deposited is a stack where the functional layer or layers of which are based on ITO. The atomic percentage of Sn in the oxide is advantageously within a range extending from 5% to 70%, in particular from 10% to 60%. More particularly, according to the invention, use is preferably made of a layer of a mixture of indium(III) oxide ($In_2O_3$) and tin (IV) oxide ($SnO_2$), the proportion by weight of the first being around 85% to 95% and the proportion by weight of the second around 15% to 5%. Specifically, these conductive but nevertheless transparent layers have low emissivities, correlated with low resistivities or sheet resistances. They are layers of materials obtained by sputtering vacuum deposition and optionally magnetron sputtering vacuum deposition. More particularly, unexpectedly, a much better performance was obtained when these ITO-based stacks were combined, on the other face of the glass substrate, with a low-emissivity coating comprising a functional (reflective) layer made of silver.

According to one preferred embodiment of the present invention, the stack deposited on the first face is a stack comprising two functional layers based on ITO, the two functional layers being separated by at least one layer of a dielectric material.

Each layer based on ITO may in particular have a physical thickness within a range extending from 20 to 80 nm, in particular from 30 to 80 nm. The cumulative physical thickness of all the layers based on ITO is preferably within a range extending from 40 to 200 nm, in particular from 60 to 160 nm.

The or each intermediate dielectric layer is preferably based on a compound chosen from the oxides, the nitrides or the oxynitrides of silicon, of aluminum, of titanium, of tin, of zinc, of zirconium, of niobium, of nickel, of chromium or of one of the mixtures thereof. It preferably essentially consists of such a compound or indeed consists of such a compound.

More particularly, the intermediate dielectric layer(s) preferably essentially consist of a compound chosen from an oxide, nitride or oxynitride of silicon and/or aluminum, a nitride or an oxide of titanium, an oxide of nickel and chromium, a nitride of niobium, or an oxide of tin and zinc.

Preferably, the or each intermediate dielectric layer is based on (or essentially consists of) silicon oxide, silicon nitride, titanium oxide, or zinc tin oxide. Silicon nitride or silicon oxide are particularly preferred. Silicon nitride or zinc tin oxide are particularly appreciated because their refractive index is close to that of ITO, and hence their presence does not alter the optical properties of the stack. Preferably, the refractive index, for a wavelength of 550 nm, of the intermediate layer(s) (in particular of the single intermediate layer) is at least 1.8, in particular 1.9, advantageously is within a range extending from 1.8 to 2.5, in particular from 1.9 to 2.2. The number of intermediate layers separating the layers based on ITO preferably varies from 1 to 5, in particular from 1 to 3 or from 1 or 2. Advantageously, the stack of thin layers comprises at least two layers (in particular two layers) based on a transparent electrically conductive oxide, these layers being separated by at most two intermediate layers, in particular by a single intermediate layer.

Among preferred combinations, the stack comprises (or consists of) in succession, starting from the substrate:
- an adhesion layer, for example based on or essentially consisting of silica;
- a first ITO layer;
- an intermediate dielectric layer, for example based on or essentially consisting of silica, silicon nitride or zinc tin oxide;
- a second ITO layer;
- a layer forming a barrier to oxygen, for example based on or essentially consisting of silicon nitride; and
- a low-refractive-index layer, for example based on or essentially consisting of silica.

As regards the second stack that reflects heat essentially by means of one or more functional layers based on a metal chosen from gold or preferably silver, positioned in particular on face 2 of the triple glazing.

The layers based on gold or preferably based on silver are deposited between dielectric coatings that generally comprise a plurality of dielectric layers allowing the optical properties of the stack to be adjusted, and allow a sufficient transmission of light to allow the chamber to be seen into from the exterior. These dielectric layers also make it possible to protect the silver layer from chemical or mechanical attacks. The stack of thin layers therefore advantageously comprises at least one silver-based functional metal layer and at least two dielectric coatings, each dielectric coating including at least one dielectric layer, so that each functional metal layer is placed between two dielectric coatings.

The stack is deposited by sputtering, in particular magnetron sputtering (magnetron process). According to this advantageous embodiment, all the layers of the stack are deposited by magnetron sputtering.

Unless otherwise indicated, the thicknesses mentioned in the present document are physical thicknesses. Thin layer is understood to mean a layer having a thickness of between 0.1 nm and 200 microns, depending on its nature and its composition.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The functional metal layer is typically based on silver and in general comprises at least 80%, preferably at least 90% and better still at least 95% or even at least 98% by weight of silver, with respect to the weight of the functional layer. The silver-based metal functional layer preferably comprises less than 1.0% by weight of metals other than silver, with respect to the weight of the silver-based metal functional layer.

The thickness of the silver-based functional layers is, in increasing order of preference, from 5 to 20 nm, from 8 to 15 nm.

The stack may comprise at least one blocking layer, the function of which is to protect the silver layers by preventing any degradation linked to the deposition of a dielectric coating or linked to a heat treatment. These blocking layers are preferably located in contact with the silver-based functional metal layers.

The stack may comprise at least one blocking layer located below, and in contact with, a silver-based functional metal layer, and/or at least one blocking layer located above, and in contact with, a silver-based functional metal layer.

Among the blocking layers conventionally used, mention may be made of blocking layers based on a metal chosen from niobium Nb, tantalum Ta, titanium Ti, chromium Cr or nickel Ni, or based on an alloy obtained from at least two of these metals, especially a nickel-chromium alloy (NiCr).

The thickness of each blocking overlayer or underlayer is preferably:
- at least 0.2 nm, or at least 0.5 nm, and/or
- at most 5.0 nm, or at most 2.0 nm.

The dielectric coatings have a thickness of greater than 15 nm, preferably of between 15 and 50 nm and better still from 30 to 45 nm.

The expression "dielectric layers having a barrier function" is understood to mean a layer made of a material capable of forming a barrier to the high-temperature diffusion of water and oxygen, originating from the ambient atmosphere or from the transparent substrate, toward the functional layer. The dielectric layers having a barrier function may be based on silicon and/or aluminum compounds chosen from oxides, such as $SiO_2$, nitrides, such as silicon nitride $Si_3N_4$ and aluminum nitrides AlN, and oxynitrides $SiO_xN_y$, optionally doped using at least one other element. The dielectric layers having a barrier function may also be based on zinc tin oxide.

The expression "dielectric layers having a stabilizing function" is understood to mean a layer made of a material which is able to stabilize the interface between the functional layer and this layer. The dielectric layers with a stabilizing function are preferably based on a crystalline oxide, in particular based on zinc oxide, optionally doped by means of at least one other element such as aluminum. The dielectric layer(s) with a stabilizing function are preferably zinc oxide layers.

The dielectric layer(s) having a stabilizing function may be located above and/or below at least one silver-based functional metal layer or each silver-based functional metal layer, either directly in contact therewith or separated by a blocking layer.

According to one advantageous embodiment, the dielectric layer based on silicon nitride and/or aluminium nitride is preferably in contact with the protective top layer, which may advantageously be based on titanium oxide or on titanium zirconium oxide as described in patent application WO 2016/097560. The dielectric layer based on silicon nitride and/or aluminum nitride has a thickness:
- of less than or equal to 100 nm, of less than or equal to 50 nm or of less than or equal to 45 nm, and/or
- of greater than or equal to 15 nm, of greater than or equal to 20 nm or of greater than or equal to 25 nm.

According to this embodiment, the stack may for example comprise:
- a dielectric coating, located below the silver-based functional metal layer;
- optionally a blocking layer;
- a silver-based functional metal layer;
- optionally a blocking layer;
- a dielectric coating, located above the silver-based functional metal layer; and
- a protective top layer.

According to one embodiment, the stack comprises:
- a dielectric coating located below the silver-based functional metal layer comprising at least one dielectric layer based on silicon nitride and/or aluminum nitride and optionally a dielectric layer having a stabilizing function, based on zinc oxide;
- optionally a blocking layer;
- a silver-based functional metal layer;
- optionally a blocking layer;
- a dielectric coating located above the silver-based functional metal layer comprising at least one dielectric layer based on silicon nitride and/or aluminum nitride; and
- a protective top layer.

According to another possible embodiment of the invention, the second stack may comprise a plurality of functional layers based on a metal chosen from gold or preferably silver, and in particular two or three layers made of silver, each thereof being separated from the following preferably by at least one layer of dielectric material, in particular such as those described above.

According to one such embodiment, the stack may for example comprise:
- a dielectric coating, located below the silver-based functional metal layer;
- optionally a blocking layer;
- a first silver-based functional metal layer;
- optionally a blocking layer;
- a dielectric coating, located above the first silver-based functional metal layer;
- optionally a blocking layer;
- a second silver-based functional metal layer;
- optionally a blocking layer;
- a dielectric coating, located above the second silver-based functional metal layer and
- a protective top layer.

As regards the coating present on face 3 or face 4 of the triple glazing, preferably on face 3 of the triple glazing, this coating is preferably a stack, the functional layer of which is based on fluorine-doped tin oxide ($SnO_2$:F). The latter material is customarily deposited via a chemical process, such as for example by chemical vapor deposition (CVD), optionally plasma-enhanced chemical vapor deposition (PECVD).

Alternatively and also preferably, the coating present on face 3 or face 4 of the triple glazing, preferably on face 3 of the triple glazing, is a stack, the functional layer of which is a silver-based heat-reflecting layer, or a stack comprising several silver functional layers, in particular of the type described above for face 2.

Various embodiments of the present invention are presented below in connection with FIG. 1 which is appended hereto:

FIG. 1 illustrates an example of a heating device comprising a triple glazing according to the invention.

The triple glazing according to FIG. 1 comprises three glass substrates positioned parallel and thus defining, from the interior to the exterior of the cavity of the device, six successive glass surfaces conventionally denoted 1 to 6 from the interior to the exterior. Between the first glass substrate and the second glass spacing, a spacing $e_1$ was made. Between the first glass substrate and the second glass spacing, a spacing $e_2$, different from $e_1$ was made. The spacings between substrates are filled with air at ambient pressure and in fluid communication with the outside. Three configurations according to the invention are represented in FIG. 1:

a) a spacing $e_1$ of 14 mm and a spacing $e_2$ of 5 mm (conf. 1).

b) a spacing $e_1$ of 12 mm and a spacing $e_2$ of 7 mm (conf. 2).

c) a spacing $e_1$ of 5 mm and a spacing $e_2$ of 14 mm (conf. 3).

According to the comparative configuration 4 (conf. 4), the three substrates are spaced apart by the same distance of 9.5 mm.

EXAMPLES

In all the examples which follow, oven doors comprising a triple glazing and in accordance with the configurations described above in relation to FIG. 1 were manufactured. More specifically:

Stacks of thin layers as defined below were deposited on a first substrate made of 4 mm-thick clear soda-lime glass: A stack in accordance with example 1 of patent application WO 2015/033067 was deposited on a first face 1 of the substrate.

More specifically, the following stack A was deposited by AC magnetron sputtering on a 4 mm-thick clear soda-lime-silica glass substrate:
Glass/$SiN_x$ (2 nm)/$SiO_2$ (34 nm)/ITO (118 nm)/$SiN_x$ (6 nm)/$SiO_2$ (65 nm)/$TiO_2$ (3 nm).

The numbers between parentheses correspond to the physical thicknesses deposited for each layer, expressed in nanometers.

The layers of silicon oxide and of silicon nitride were deposited using silicon targets doped with (8 at %) aluminium, in an argon plasma with addition of oxygen and nitrogen respectively. The ITO layers were deposited using ITO targets in an argon plasma. The ITO layer consists of a mixture of indium (III) oxide ($In_2O_3$) and tin (IV) oxide ($SnO_2$), the proportion by weight of the first being around 90% and the proportion by weight of the second round 10%. The $SiN_x$ barrier layer was deposited under a pressure of 2.0 pbar. The normal emissivity of this stack, as measured according to standard FR-EN 12898, was 18%.

On the second face 2 of this first substrate, the following stack B, comprising a silver functional layer, and the normal emissivity of which was 3%, was deposited using conventional sputtering deposition techniques:
Glass/$SiN_x$ (30 nm)/ZnO (5 nm)/NiCr (0.5 nm)/Ag (12 nm)/NiCr (0.5 nm)/ZnO (5 nm)/$SiN_x$ (30 nm)/$TiO_2$ (3 nm).

As second substrate, use was made of a substrate sold by AGC under the reference Planibel G®, comprising a 4 mm-thick clear soda-lime-silica glass sheet, on one face of which a coating C, consisting of a layer of fluorine-doped tin oxide, was deposited by pyrolysis-CVD.

The third substrate was a 4 mm-thick clear soda-lime-silica glass sheet, the faces of which were bare, i.e. not covered with the above coatings.

Examples 1 to 3 (According to the Invention)

Oven doors were manufactured according to the techniques of the art that comprise the assembling of the three glass substrates described above according to the configurations A to C described in connection with FIG. 1, including:
- a first substrate as described above comprising the coating A on face 1 and the coating B on face 2 of the door,
- the Planibel G® second substrate, in such a way that the coating C is oriented toward the interior of the door, i.e. is on face 3 of the triple glazing and of the door,
- then the third glass substrate, the bare faces of which are faces 5 and 6 of the triple glazing (cf. FIG. 1) and of the door.

According to example 1, a spacing $e_1$ of 14 mm was made between the first two substrates and a spacing $e_2$ of 5 mm was made between the second and third substrates.

According to example 2, a spacing $e_1$ of 12 mm was made between the first two substrates and a spacing $e_2$ of 7 mm was made between the second and third substrates.

According to example 3 a spacing $e_1$ of 5 mm was made between the first two substrates and a spacing $e_2$ of 14 mm was made between the second and third substrates.

Example 4 (Comparative)

According to this example 4, the same manufacturing steps as examples 1 to 3 were reproduced, but the three glass substrates were spaced apart by the same distance of 9.5 mm.

Example 5 (Comparative)

According to this example 5, this time a quadruple glazing was assembled for the manufacture of the oven door by repeating the configuration from example 4 to which a fourth glass substrate was added on the exterior side, the fourth substrate being a 4 mm-thick clear glass substrate, the faces of which are bare, each substrate being spaced apart from the next by a distance of 6 mm so as to retain a door thickness comparable to the preceding examples.

Example 6 (Comparative)

According to this example 6, this time a triple glazing was assembled for the manufacture of the oven door, using three Planibel G® substrates. The Planibel substrates were all oriented in such a way that the coating C was turned toward the interior of the door, i.e. the coating C was positioned on face 1, 3, and 5 of the triple glazing. According to this example 6, a spacing $e_1$ of 14 mm was made between the first two substrates and a spacing $e_2$ of 5 mm was made between the second and third substrates.

Example 7 (Comparative)

According to this example 7, this time a quadruple glazing was assembled for the manufacture of the oven door, using three Planibel G® substrates as described in example 6. The Planibel substrates are used as the first three substrates of the quadruple glazing. They are all oriented in such a way that the coating C is turned toward the interior of the door, i.e. the coating C is positioned on face 1, 3, and 5 of the quadruple glazing, the fourth substrate being a 4 mm-thick clear glass substrate, the faces of which are bare. The substrates are spaced apart by the same distance of around 6 mm.

The cavity of an oven equipped with resistors and provided with various doors according to examples 1 to 6 was then heated at a temperature of the order of 430° C. The results are reported in table 1 below:

In table 1, a face coated with the stack A (comprising the ITO functional layer) is denoted A, a face coated with the stack B (comprising the silver functional layer) is denoted B, a face coated with the coating C (comprising the pyrolytic $SnO_2$:F layer) is denoted C and an uncoated face is denoted X.

It is indicated that, according to the GIFAM (Groupement Interprofessionnel des Fabricants d'Appareils d'Equipement Ménager [Interprofessional Group of Domestic Appliance Manufacturers]), the maximum temperature of the exterior wall of the door of an oven must never exceed 70° C. in order for the appliance to be considered a "cold door" appliance.

TABLE 1

| Example | F1 | F2 | F3 | F4 | F5 | F6 | F7 | F8 | $e_1$ | $e_2$ | $e_3$ | Average T° of the cavity (° C.) | Exterior wall temperature (° C.) |
|---|---|---|---|---|---|---|---|---|---|---|---|---|---|
| 1* | A | B | C | X | X | X | — | — | 14 | 5 | — | 430 | 67 |
| 2* | A | B | C | X | X | X | — | — | 12 | 7 | — | 430 | 70 |
| 3* | A | B | C | X | X | X | — | — | 5 | 14 | — | 430 | 70 |
| 4 | A | B | C | X | X | X | — | — | 9.5 | 9.5 | — | 430 | 77 |
| 5 | A | B | C | X | X | X | X | X | 6 | 6 | 6 | 430 | 65 |
| 6 | C | X | C | X | C | X | — | — | 14 | 5 | — | 430 | 83 |
| 7 | C | X | C | X | C | X | X | X | 6 | 6 | 6 | 430 | 73 |

*invention

In table 1, the temperature of the exterior wall of the door indicates the maximum temperature measured on the exterior glass pane of the door, $e_1$ is the spacing between substrate 1 and substrate 2, $e_2$ is the spacing between substrate 2 and substrate 3 in a triple glazing. In the case of a quadruple glazing, $e_3$ is the spacing between substrate 3 and substrate 4.

The results reported in table 1 demonstrate the advantages of the present invention:

Example 7 is representative of an oven door currently used. It comprises 4 glazings, a heat-reflecting coating being positioned on faces 1, 3 and 5 of the glazing. For an average temperature of the cavity of 430° C., an exterior temperature of 73° C. is observed.

The reference example 5 is a quadruple glazing in which heat-reflecting coatings have been deposited on faces 1, 2 and 3 of the various glass substrates. In this configuration, the maximum temperature measured on the exterior face 6 of the door, in contact with the outside, is equal to 65° C. when the cavity of the oven is brought to 430° C. Such a temperature makes it possible to guarantee user safety, even when the oven is brought to a very high temperature, under pyrolysis conditions for example. The drawback of such a configuration is however linked to the use of 4 glass substrates, making the door heavy and making the manufacture thereof substantially more expensive.

In example 4, the fourth substrate has been removed, the spacing $e_1$ between the first and second substrates and the spacing $e_2$ between the second and third substrates being kept substantially identical. A significant increase in the exterior temperature of the door is then observed.

In examples 1 to 3 according to the invention, the configuration of example 4 (triple glazing configuration) has been modified, by modifying the respective spacings $e_1$ and $e_2$, the thickness of the door being kept constant. A significant reduction in the exterior temperature of the door is observed, down to values comparable with that of the reference example 5. A particularly advantageous configuration of the invention in which $e_1$ is greater than $e_2$ is illustrated by example 1.

Thus, according to the invention and by means of a particular combination combining a triple glazing provided with three heat-reflecting stacks respectively on faces 1, 2 and 3 of said triple glazing and a particular spacing selected between the three glass substrates, it is possible to provide lighter oven doors that even so have all the safety guarantees for the user.

Example 6 should be compared with example 7 in accordance with current practice. It can thus be observed that the removal of the fourth substrate (example 6) cannot in this case be compensated for by a different spacing between the three substrates as observed by comparison between the respective examples 5 and 1 to 3.

It thus appears, in view of these two examples, that it is indeed the particular combination of the positioning of the reflective coatings and of the selection of the spacing between substrates which makes it possible to minimize the temperature of the exterior face of the door.

The invention claimed is:

1. A heating device equipped with a chamber defining a cavity, said device comprising a door or wall incorporating a triple glazing comprising first, second and third transparent substrates defining, from an interior to an exterior of the cavity, six faces numbered 1 to 6 respectively, at least the faces 1 and 2 of the first substrate and 3 and/or 4 of the second substrate being covered with heat-reflecting coatings, wherein a mean spacing $e_1$ between the first substrate and the second substrate and a mean spacing $e_2$ between the second substrate and the third substrate is different, a ratio between a largest spacing of one of $e_1$ and $e_2$ and a smallest spacing of the other one of $e_1$ and $e_2$ being greater than 1.1, $e_1$ and $e_2$ being between 2 and 20 mm, and wherein $e_1 > e_2$.

2. The heating device as claimed in claim 1, wherein faces 1 and 2 of the first substrate and face 3 of the second substrate are covered with heat-reflecting coatings, faces 4 to 6 being free of such coatings.

3. The heating device as claimed in claim 1, wherein $e_1$ and $e_2$ are between 4 and 15 mm.

4. The heating device as claimed in claim 1, wherein the triple glazing comprises:
   a) for the first substrate in contact with the cavity:
      on the face 1, turned toward the interior of and in direct contact with said cavity, a first stack that reflects heat essentially by means of one or more functional layers based on a transparent conductive oxide,
      on the other face 2, turned toward the exterior of said cavity, a second stack that reflects heat essentially by means of one or more functional layers based on a metal chosen from gold or silver,
   b) for the second substrate:
      on the face 3 turned toward the interior of said cavity, a third stack that reflects heat essentially by means of one or more functional layers based on a transparent conductive oxide,
      the face 4 of the second substrate being free of a heat-reflecting coating, the faces 5 and 6 being free of a heat-reflecting coating.

5. The heating device as claimed in claim 1, wherein the multiple glazing comprises:
   a) for the first substrate in contact with the cavity:
      on the face 1, turned toward the interior of and in direct contact with said cavity, a first stack that reflects heat essentially by means of one or more functional layers based on a transparent conductive oxide,
      on the other face 2, turned toward the exterior of said cavity, a second stack that reflects heat essentially by means of one or more functional layers based on a metal chosen from gold or silver,
   b) for the second substrate:
      on the face 3 turned toward the interior of said cavity, a third stack that reflects heat essentially by means of one or more functional layers based on a metal chosen from gold or silver,
      the face 4 of the second substrate being free of a heat-reflecting coating, the faces 5 and 6 of the third substrate being free of a heat-reflecting coating.

6. The heating device as claimed in claim 1, wherein the first coating on the first face 1 of the first substrate comprises, as functional layer, an indium tin oxide, the atomic percentage of Sn of which in the oxide is within a range extending from 5% to 70%.

7. The heating device as claimed in claim 1, wherein the first coating on the first face 1 of the first substrate comprises, as functional layer, an indium tin oxide comprising a proportion by weight of around 85% to 95% of indium oxide and around 15% to 5% of tin oxide.

8. The heating device as claimed in claim 1, wherein the first coating on the first face 1 of the first substrate comprises, in succession, starting from the substrate:
   at least one underlayer of a dielectric compound chosen from silicon nitride, silicon oxide or zinc tin oxide,
   an ITO functional layer, and
   at least one overlayer of a dielectric compound chosen from silicon nitride, silicon oxide, or zinc tin oxide.

9. The heating device as claimed in claim 1, wherein the first coating on the first face 1 of the first substrate comprises, in succession, starting from the substrate:
   at least one underlayer of a dielectric compound chosen from silicon nitride, silicon oxide or zinc tin oxide,
   a first ITO functional layer,
   an intermediate layer of a dielectric compound chosen from silicon oxide, silicon nitride or zinc tin oxide,
   a second ITO functional layer; and at least one overlayer of a dielectric compound chosen from silicon nitride, silicon oxide, or zinc tin oxide.

10. The heating device as claimed in claim 1, wherein the second coating on the face 2 of the first substrate comprises at least one silver-based functional metal layer and at least two dielectric assemblies, each dielectric assembly comprising at least one dielectric layer, so that each silver-based layer is positioned between two dielectric layers.

11. The heating device as claimed in claim 1, wherein the third coating on the face 3 of the second substrate or on the face 4 of the second substrate comprises at least one silver-based functional metal layer and at least two dielectric assemblies, each dielectric assembly comprising at least one dielectric layer, so that each silver-based layer is positioned between two dielectric layers.

12. The heating device as claimed in claim 1, wherein at least the coated substrate of the stack is curved and/or tempered and wherein all the substrates of the glazing are tempered.

13. The heating device as claimed in claim 1, wherein the ratio between the largest spacing of one of $e_1$ and $e_2$ and the smallest spacing of the other one of $e_1$ and $e_2$ is greater than 2.

14. A door or wall for a heating device comprising a triple glazing, the triple glazing including first, second and third transparent substrates which define, from an interior to an exterior of the cavity of said device, six faces numbered 1 to 6 respectively, at least the faces 1 and 2 of the first substrate and 3 of the second substrate being covered with heat-reflecting coatings, wherein a mean spacing $e_1$ between the first substrate and the second substrate and a mean spacing $e_2$ between the second substrate and the third substrate is different, a ratio between a largest spacing of one of $e_1$ and $e_2$ and a smallest spacing of the other one of $e_1$ and $e_2$ being greater than 1.1, and wherein $e_1 > e_2$.

15. The door or wall for a heating device as claimed in claim 14, wherein the faces 1 and 2 of the first substrate and face 3 of the second substrate are covered with heat-reflecting coatings, the faces 4 to 6 being free of such coatings.

16. The door or wall for a heating device as claimed in claim 14, wherein said triple glazing comprises:
a) for the first substrate in contact with the cavity:
on the face 1, turned toward the interior of and in direct contact with said cavity, a first stack that reflects heat essentially by means of one or more functional layers based on a transparent conductive oxide,
on the other face 2, turned toward the exterior of said cavity, a second stack that reflects heat essentially by means of one or more functional layers based on a metal chosen from gold or silver,
b) for the second substrate:
on the face 3 turned toward the interior of said cavity, a third stack that reflects heat essentially by means of one or more functional layers based on a transparent conductive oxide.

17. The door or wall for a heating device as claimed in claim 16, wherein said triple glazing comprises:
a) for the first substrate in contact with the cavity:
on a first face 1, turned toward the interior of and in direct contact with said cavity, a first stack that reflects heat essentially by means of one or more functional layers based on a transparent conductive oxide,
on the other face 2, turned toward the exterior of said cavity, a second stack that reflects heat essentially by means of one or more functional layers based on a metal chosen from gold or silver,
b) for the second substrate:
on the face 3 turned toward the interior of said cavity, a third stack that reflects heat essentially by means of one or more silver-based functional layers.

* * * * *